(12) United States Patent
Poe et al.

(10) Patent No.: US 11,873,938 B2
(45) Date of Patent: Jan. 16, 2024

(54) PRESSURE-RESPONSIVE, DEFORMABLE, SELF-INTEGRATING PIGGING ELEMENT FOR USE IN PIPELINE PIGGING APPLICATIONS

(71) Applicant: TDW Delaware, Inc., Wilmington, DE (US)

(72) Inventors: Roger L. Poe, Beggs, OK (US); Matt Logan, Broken Arrow, OK (US); John R. Morrow, Tulsa, OK (US); Charles G. Boellstorff, Tulsa, OK (US)

(73) Assignee: TDW Delaware, Inc., Wilmington, DE (US)

( * ) Notice: Subject to any disclaimer, the term of this patent is extended or adjusted under 35 U.S.C. 154(b) by 292 days.

(21) Appl. No.: 17/211,257

(22) Filed: Mar. 24, 2021

(65) Prior Publication Data
US 2021/0301966 A1    Sep. 30, 2021

Related U.S. Application Data

(60) Provisional application No. 62/994,039, filed on Mar. 24, 2020.

(51) Int. Cl.
| | |
|---|---|
| *F16L 55/10* | (2006.01) |
| *F16L 55/128* | (2006.01) |
| *F16L 55/134* | (2006.01) |
| *F16L 55/44* | (2006.01) |

(52) U.S. Cl.
CPC ......... *F16L 55/1283* (2013.01); *F16L 55/134* (2013.01); *F16L 55/44* (2013.01)

(58) Field of Classification Search
CPC ...... F16L 55/1283; F16L 55/134; F16L 55/44
USPC .................................................. 138/97, 89, 93
See application file for complete search history.

(56) References Cited

U.S. PATENT DOCUMENTS

| | | | | |
|---|---|---|---|---|
| 2,184,634 | A | * 12/1939 | Crickmer | E21B 33/1208 138/89 |
| 3,204,274 | A | * 9/1965 | Knapp | B08B 9/0553 15/104.061 |
| 3,835,889 | A | * 9/1974 | Hyde | G01M 3/005 15/104.061 |

(Continued)

FOREIGN PATENT DOCUMENTS

| | | |
|---|---|---|
| DE | 3511260 A1 | 10/1986 |
| EP | 0940191 A2 | 9/1999 |

(Continued)

*Primary Examiner* — James F Hook
(74) *Attorney, Agent, or Firm* — GableGotwals (57) ABSTRACT

A pipeline pigging element (10) that changes its size in an axial and a radial direction as a function of applied pipeline pressure. The pigging element includes at least two circumferential zones (13, 15) having different section modulus than one another, each of the zones changing at different rates from one another between an uninflated and an inflated state at the applied pipeline pressure. The pigging element reacts to changes in pipe geometry, having a first length and a first diameter at a first applied pipeline pressure and a second length and a second diameter different than the first at a second applied pipeline pressure. As the pigging element wears, it becomes easier to inflate at the applied pressure and sealing contact with the pipe wall remains substantially unaffected. No onboard pumps or fluid circuits are required to inflate the pigging element.

22 Claims, 5 Drawing Sheets

(56) References Cited

U.S. PATENT DOCUMENTS

| | | | | |
|---|---|---|---|---|
| 4,077,435 A * | 3/1978 | Van Scoy | ............ | F16L 55/1283 |
| | | | | 138/93 |
| 4,314,577 A * | 2/1982 | Brister | ................ | F16L 55/1283 |
| | | | | 137/15.07 |
| 4,790,356 A * | 12/1988 | Tash | .................... | G01M 3/2853 |
| | | | | 4/255.09 |
| 5,028,056 A * | 7/1991 | Bemis | .................... | B29C 70/086 |
| | | | | 277/572 |
| 5,230,842 A * | 7/1993 | Munde | .................... | F16L 55/26 |
| | | | | 264/269 |
| 5,771,937 A * | 6/1998 | Collins | ................ | G01M 3/022 |
| | | | | 138/93 |
| 5,996,158 A * | 12/1999 | DeLorme | ............. | B08B 9/0553 |
| | | | | 15/104.061 |
| 6,058,977 A * | 5/2000 | Hotta | ................ | H01R 13/5205 |
| | | | | 220/601 |
| 7,073,535 B1 * | 7/2006 | Warmerdam | ......... | F16L 55/134 |
| | | | | 138/93 |
| 8,051,524 B2 * | 11/2011 | Ferreira Lino | ......... | F16L 55/38 |
| | | | | 15/104.19 |
| 2013/0153219 A1 * | 6/2013 | Abrahamsen | ....... | E21B 33/1208 |
| | | | | 166/192 |
| 2014/0209126 A1 * | 7/2014 | Doig | .................... | B08B 9/0553 |
| | | | | 134/22.12 |
| 2016/0310998 A1 * | 10/2016 | Hailey | ................ | B08B 9/0557 |

FOREIGN PATENT DOCUMENTS

| | | |
|---|---|---|
| EP | 1011881 A1 | 6/2000 |
| GB | 1329206 A | 9/1973 |

\* cited by examiner

PRESSURE-RESPONSIVE, DEFORMABLE, SELF-INTEGRATING PIGGING ELEMENT FOR USE IN PIPELINE PIGGING APPLICATIONS

CROSS REFERENCE TO CO-PENDING APPLICATIONS

This application claims the benefit of U.S. 62/994,039 filed Mar. 24, 2020, the entire content of which is incorporated by reference herein.

BACKGROUND

This disclosure is in the field of pipeline pigging and pig traps like those used in the servicing of oil and gas pipelines. More particularly, the disclosure is in the field of pigging elements intended for contact with a pipe wall.

Pipeline pigs generally include a mandrel and one or more pigging elements arranged about the mandrel. These elements can be designed in a multitude of different geometries to best suit a particular pigging application. The mandrel and pigging elements may be made of metal or an elastomer such as rubber or urethane. In some applications, the pig may be a foam pig. The mandrel may be a longitudinally extending cylindrical-shaped mandrel. The pigging elements may be integrally formed with the mandrel, as is the case with a foam pig, or may be fastened to the mandrel. The pigging elements may be configured to provide for sealing capability between the element and the opposing pipe wall. In some applications, the pig may a spherical-shaped pig like those used to dewater a pipeline.

Regardless of its configuration, as a pipeline pig travels through the line, the metal or elastomer pigging elements that contact the pipe wall abrade and wear. Abrasion is particularly high in dry gas pipelines as compared to that in liquid pipelines. Regardless of pipeline product, the lost material results in reduced sealing ability as the force between the pig and the pipe wall is diminished. Over time a typical pigging element as would be designed today could lose up to 50% of its sealing capability in the first 10 miles of pipeline transit. This is especially concerning in that many pipeline applications can be well over 100 miles in length and some more than 500 miles.

The loss of sealing capability may be indicated locally by a decrease in the differential pressure across the element, or it may be indicated globally as a decrease in the amount of fluid flow through the pipeline at a given pressure. A decrease in the amount of fluid flow at a given pressure is also a base indication that the line is being choked by contaminants and, therefore, is in need of pigging. Contaminants that can choke a line include, but are not limited to, dirt, wax, and hydrate formations.

Pipeline pigs are designed to perform a specific task over extended transit distance through a pipeline. These tasks include, but are not limited to, dewatering, cleaning, isolation, and inspection. However, testing conducted by the inventors on third party pigs has found that the sealing capability of the pigs, as measured by differential pressure ("dP") across the pig, may degrade appreciably and quickly over the course of its transit through a pipeline. In some cases, after only 3 to 5 miles of transit pigging elements were worn to the point where the pigs were no longer able to perform any useful work. This is an unexpected and surprising result given the pigs tested were generally designed to handle pipeline transits far greater than this, upwards of 150 to 200 miles. The inventors now know that, based on their testing and the measured dP, most pigs can handle only a small fraction of this transit distance before losing effectiveness or, in the worst cases, becoming so worn as to be ineffective for their intended task. By way of example, a pig may lose up to $\frac{1}{8}$" to a $\frac{1}{4}$" inch of material. A loss of $\frac{1}{8}$" can translate into a five fold drop, from 20 or 21 psi to 4 psi.

The urethane materials typically used for the pigging elements are very elastic in their formation, allowing the material to act much like a spring. This capability of the urethane chemistry allows the urethane to remain flexible but vary in deformation as a function of its section modulus and applied force. For example, a relatively thin section can, with little force, expand to more than 500% of its initial state before failure. This flexibility can be observed in the pipeline cups and disks used on many different types of pigging assemblies.

SUMMARY

Embodiments of a pigging element of this disclosure are configured to maintain higher average normal forces and subsequent sealing capability during transit through a pipeline than prior art pigging elements. Transit length may be in a range of 5 miles to 500 miles, there being discrete values and subranges within this broad range. Sealing efficiency may be held to a performance level closely associated with the initial (maximum) level of sealing as noted when new. As the pigging element wears it becomes easier to inflate by way of differential pressure, thereby maintaining sealing engagement with the pipe wall. By way of a non-limiting example, as the pig element experiences material in a range of $\frac{1}{8}$" to $\frac{1}{4}$" (or more), the original sealing capability is maintained (e.g. 20 to 21 psi).

In some embodiments, 85% to 90%, 90% to 95%, and 95% to 99% of the original sealing capability is maintained over a predetermined transit distance or service life of the element. The pigging element may be configured as a pig requiring no sealing cups or disks when in an intended use in the pipeline or may be configured as a sealing cup or disk arranged about a mandrel. The sealing cup or disk and mandrel may be integrally formed. The pigging element when in an intended use in a pipeline expands and contracts axially and circumferentially (radially outward or inward) in response to pipeline pressure.

Sealing performance is accomplished with a hollow body design and a wall thickness or section modulus that allow appropriately engineered surfaces to maximize the potential deflection of the pigging element, allowing the normal forces between the pipe wall and the pigging element be maintained or balanced between its axial capability and its radial sealing capability. The section modulus can be accomplished by structural hoops or ribs that provide rigidity (hoop strength). The structural ribs hold the pigging element at a minimum uninflated diameter and then, as pressure is applied, the pigging element inflates to a sealing position in contact with the pipe wall. The thinner section modulus located between adjacent structural ribs inflate first and, in turn, so do the ribs. In this inflated positions, both the thicker and thinner section modulus contact the pipe wall.

Embodiments of this disclosure help to ensure that as the pigging element begins to wear, and as the section modulus is reduced, deflection is increased proportionally to maintain the seal. And as the pigging element wears, inflation of the different section moduli becomes easier to accomplish. Therefore, the forces against the pipeline wall can be maintained at or near a maximum.

The pigging element does not require inflation means such as additional fluids, chemicals or pumps and, compared to prior art elements of an equivalent size and purpose, elements of this disclosure are lighter in weight and easier and less costly to produce. When configured as a pipeline pig with bypass flow, or as a disk, the pigging element may be used bi-directionally.

The hollow body of the pigging element may be made of an elastomer material such as urethane or its equivalent. The material selected should be one that is resistant to the pipeline product the pigging element is intended to be exposed to. Because the hollow body is deformable axially and radially, the pigging element can integrate to, or conform with, the pipe wall without the need of additional fluids, chemicals or pumps while maintaining the necessary normal forces between the pigging element and the pipeline wall.

The hollow body includes internal structure (ribs or hoops) that allows the shape of the body to be modified by pressure but maintain the normal forces against the pipeline wall. The internal structure also acts as a spring to keep the body open and surfaces lying prone to the pipeline wall such that the pig resists flipping or turning inside out. In embodiments, the internal structure includes a plurality of alternative circumferential bands, with one set of bands having a reduced section modulus relative to the other set of bands. The bands predispose the pigging element to stretch axially and allow the element to perform in multiple diameters of pipe.

Pigging elements of this disclosure may be arranged as, or designed for use with, pipeline pigs configured for dewatering, cleaning, isolation, and inspection tasks, or some combination thereof. The hollow body may be a mandrel, which may be configured as a pipeline pig, or it may be a pigging element configured for use about a mandrel. In some embodiments the pigging element and mandrel form the pipeline pig, as is the case with a foam pig. The pigging element may be secured to the mandrel or may be integrally formed with the mandrel. The pigging elements may be disk- or cup-shaped or any shape appropriate for a given pipeline pigging application. In some embodiments, the pigging element is cylindrical-shaped. In other embodiments, the pigging element is spherical-shaped. In yet other embodiments, the pigging element is a truncated cone or is bullet-shaped.

In embodiments, when in an intended use in a pipeline, the pigging element expands and contracts in two dimensions between a first size and a second size different than the first. For example, the first size may be a first length and diameter and the second size may be a second length and diameter different than the first. The first length may be shorter than the second length and the first diameter may be greater than the second diameter. The first length may be a minimum length and the second length may be a maximum length. The first diameter may be a maximum diameter and the second diameter may be a minimum diameter. The converse is also true (e.g. the first length being the shorter length and the larger diameter). In embodiments, the pigging element moves to intermediate different lengths and diameters between the first and second different lengths and diameters.

DETAILED DESCRIPTION

Embodiments of a pipeline pigging element of this disclosure is capable of changing its size in an axial and a radial direction as a function of applied pressure when traversing an interior of a pipeline. The pipeline pigging element includes an elastomeric body having a first circumferential band or zone having a first section modulus and a second circumferential band or zone having a second section modulus different than that of the first section modulus. One or both of the zones may appear spring-like or accordion-like as the element changes its geometry. Each of the first and second circumferential zones change at different rates from one another between an uninflated and an inflated state at the applied pressure or from one inflated state to another. As the thinner section modulus inflates it works to stretch the thicker section modulus, leading it to inflate.

The second circumferential band is located adjacent the first circumferential band. The bands may alternate with one another or there may be a plurality of one of the bands located in between a pair of the other of the bands. The elastomeric body, when traversing the interior of the pipeline, has a first length and a first diameter at a first applied pressure and a second length and a second diameter at a second applied pressure; the second length, diameter, and applied pressure being a different length, diameter, and applied pressure than the first length, diameter, and applied pressure. The first and second circumferential zones may each have different lengths and diameters.

Figure 4:
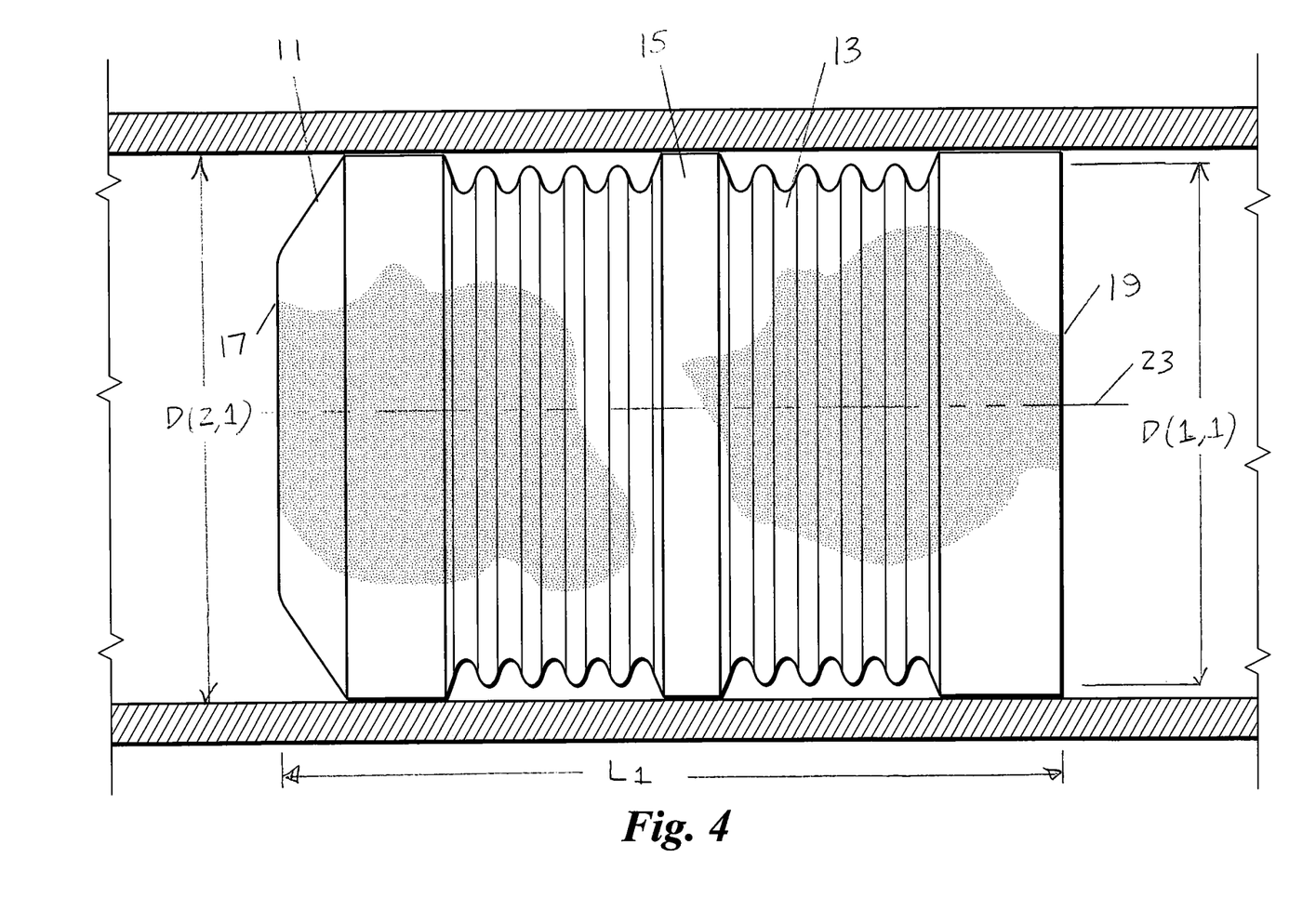
FIG. 4 is a front elevation view of an embodiment of a pig of this disclosure in an expanded, second length and diameter. Expansion occurs when under differential pressure. In this example, the minimum uninflated diameter is substantially equal to the pipe ID.
Figure 5:
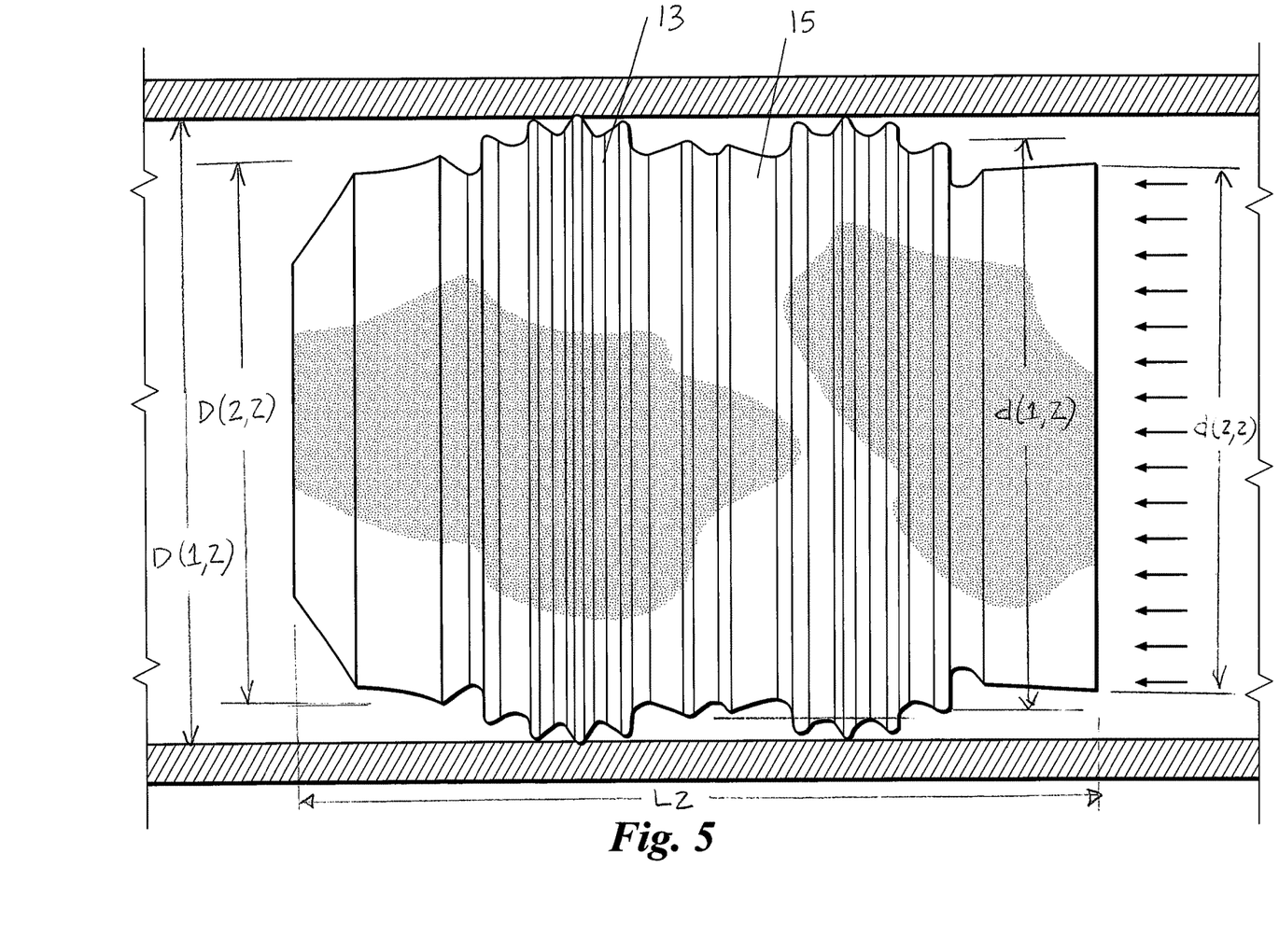
FIG. 5 is simulation of the embodiment of FIG. 4 as pressure is applied to expand the pig for its intended task in a different section of pipe. The pigging element is shown in an intermediate inflated position as the thinner section modulus begins to inflate. By way of a non-limiting example, the pig's diameter changes by approximately 0.2 inches. Its length increases by roughly 1.5 inches.

The first and second diameters may be a maximum or a minimum diameter of the circumferential zones or bands. In embodiments, because of the different section moduli, a portion of the pigging element may be at a sealing diameter and another portion of the element may be inward of the sealing diameter when in an intermediate inflated position. For example, a portion of one of the zones may be at the sealing diameter while another portion of that same zone is not (e.g. a sinusoidal shape within the zone; see e.g. FIG. 5). Or, one circumferential bands or zones (or a portion thereof) may be at a sealing diameter in a first state, with the other zone not at the sealing diameter when in the first state, and then when in a second state the other zone (or a portion thereof) may be at the sealing diameter while the one zone is no longer at the sealing diameter. Compare e.g. FIGS. 4 and 5. The first and second diameters may be located in one of the bands or zones, and each band or zone may have a different diameter than the other depending on the portion of pipeline being traversed by the pigging element and the applied pressure.

As the elastomeric body wears, that is, loses material due to contact with the pipe wall and associated debris, the body becomes more flexible and continues to change its geometry to ensure an appropriate seal is maintained with the pipeline inner surfaces.

When the pigging element moves between the first length (axially) and diameter (radially) and the second length and diameter, a sealing force between the elastomeric body and a wall of the pipeline remains substantially unchanged. As the elastomeric body wears during its traverse of the pipeline, a sealing force between the elastomeric body and a wall of the pipeline remains constant in a range of 85% to 99% of an original sealing force, there being discrete values as well as subranges within this broader range (e.g. 85% to 90%, 90% to 95%, 95% to 99% of the original sealing force). For the purposes of this disclosure, the original sealing force is the sealing force exerted by the elastomeric body against the pipe wall when in its unworn state.

In embodiments, the pigging element does not include a mandrel. Instead, the elastomeric body defines and surrounds a hollow interior. Where the pigging element includes a mandrel, the pigging element may be a sealing cup or disk configured for connection to the mandrel. In other embodiments, the pigging element may be configured as a pig and not include a sealing cup or disk. The pig may be is a spherical shaped pig or can be a bullet shaped pig. In yet other embodiments, the pig may be configured as a scraping pig. The pig may be sealing cup-free or sealing disk-free.

A method of this disclosure maintains sealing forces of a pigging element against a wall of a pipeline as the pigging element traverses the pipeline and wears from contact with the pipeline wall and associated debris. Because the pigging element can change size in the axial and radial direction the sealing forces are maintained within a predetermined range of the original sealing force. The method includes providing a pigging element of this disclosure, launching the pigging element into the pipeline, and allowing the pigging element to traverse the line under differential pressure from product flow. As the applied pressure changes, whether that is a change in product flow or a restriction through which the pigging element passes (or some combination thereof), the pigging element automatically responds with a corresponding change in its geometry as a function of that pressure change. No onboard hydraulic or pneumatic control lines (and their associated pumps and controls) are required.

Embodiments of a pigging element 10 of this disclosure include a hollow body 11 made of an elastomer material and having at least one first 13 and at least two second circumferential bands 15 or zones of different section modulus (wall thickness) between its forward 17 and rearward 19 ends. The bands 15 may be thicker and provide rigidity or hoop strength to the pigging element 10. The term, hollow body, means a body having an empty or hollow center section 21 (e.g., a removed volume of material) located about a central longitudinal axis 23 of the pigging element.

The rearward end 19 of the pigging may have an angle α to it starting at predetermined distance from longitudinal centerline 23 or internal ID. In embodiments, the angle may be in a range of 5° to 15°, there being discrete values and subranges within this broader range. For purposes of this disclosure, the longitudinal axis or direction is in the axial direction of the pipeline, the radial direction being orthogonal to it. The bands 13, 15 surround or encircle the empty center section 21.

The second circumferential band 15 may be accomplished by a structural (stiffening) rib or hoop 14 that provides additional wall thickness. The structural ribs 14 hold the pigging element at a minimum uninflated diameter and then, as pressure is applied, the pigging element 10 inflates to a sealing or contact position with the pipe wall. The thinner section modulus 13 is located between adjacent structural ribs 14 and inflates first (or sooner than the thicker section modulus 15 begins to inflate). As the thinner section modulus 13 influates it stretches the thicker section modulus 15 leading it to inflate at the applied pressure. In this inflated positions, both the thicker and thinner section moduli 13, 15 contact the pipe wall.

The ribs 14 help provide the thicker section modulus 15. By way of a non-limiting example, the thicker section modulus 15 may be in a range of ¾" to 1" wide whereas the rib-free thinner section modulus may be in a range of 3" to 4" wide 15.

In a first state, the bands 13, 15 or zones (or a portion thereof) have a diameter "D(band or zone, state)," the state being defined by a respective pipeline interior and applied or differential pressure. For example, the first circumferential band 13 has a diameter D(1,1) when in the first state and a diameter D(1,2) when in the second state. The first state may be an uninflated state and the second state may be a partially or fully inflated state. The second circumferential band 15 has a diameter D(2,1) when in the first state and a diameter D(2,2) when in the second state. The diameters may be a sealing diameter. Where the second circumferential band 15 has the thicker section modulus, the diameter D(2,1) may represent the maximum uninflated diameter of the pigging element 10. The converse would hold true where the first circumferential band 13 has the thicker section modulus.

For example, when D(1,1)>D(2,1), the first circumferential band 13 is at a sealing diameter whereas the second circumferential band 15 is not. Similarly, when D(2,2) is greater than D(1,2), the second circumferential band 15 is at a sealing diameter whereas the first circumferential band 13 is not. The sealing diameter is the diameter of the pigging element when in the respective state. Within each zone 13, 15, there may be intermediate diameters "d(band or zone, state)." For example, the second circumferential band 15 may have a portion with a diameter d(2,2) less than D(2,2), as can the first circumferential band 13 (e.g. d(1,2)). See e.g. FIG. 5. In a final inflated state, D(1,2) may equal D(2,2). D(1,1) and D(2,1) may be the diameters when in uninflated state.

Although two states and corresponding diameters and lengths are used in this disclosure for purposes of illustration and explanation, persons of ordinary skill in the art would recognize a pigging element 10 of this disclosure may experience more than two states when in a pipeline and change correspondingly to each of those multiple states.

In embodiments, the first circumferential band 13 has a smaller or thinner section modulus than the second circumferential bands 15. The first band 13, which has a second circumferential band 15 on each side of it, provides a spring-like property to the element. In some embodiments, the pigging element 10 includes a plurality of first bands 13 or zones of reduced section modulus and a plurality of second bands 15 or zones with a section modulus greater than that of the first. The first and second bands 13, 15 may have different widths w1, w2 in addition to different section modulus. In other embodiments, the first circumferential band 13 may have the larger section modulus and the second circumferential band 15 may have the thinner section modulus. Regardless, the pigging element 10 must have at least two different section moduli, one providing rigidity and helping to maintain its uninflated size, the other less rigid and more easily inflatable.

Figure 2:
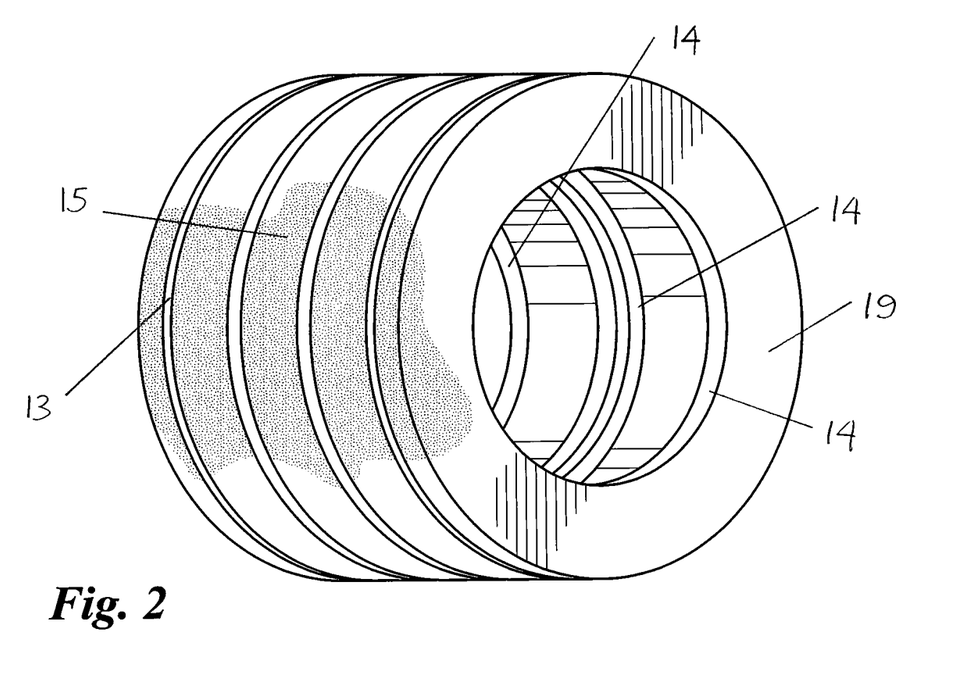
FIG. 2 is a rear isometric view the pig of FIG. 1. The pig includes a hollow body with internal structure that allows the shape of the body to be modified by pressure but maintain the normal forces against the pipeline wall. The internal structure also acts as a spring to keep the body open and surfaces lying prone to the pipeline wall such that the pig resists flipping or turning inside out.
Figure 3:
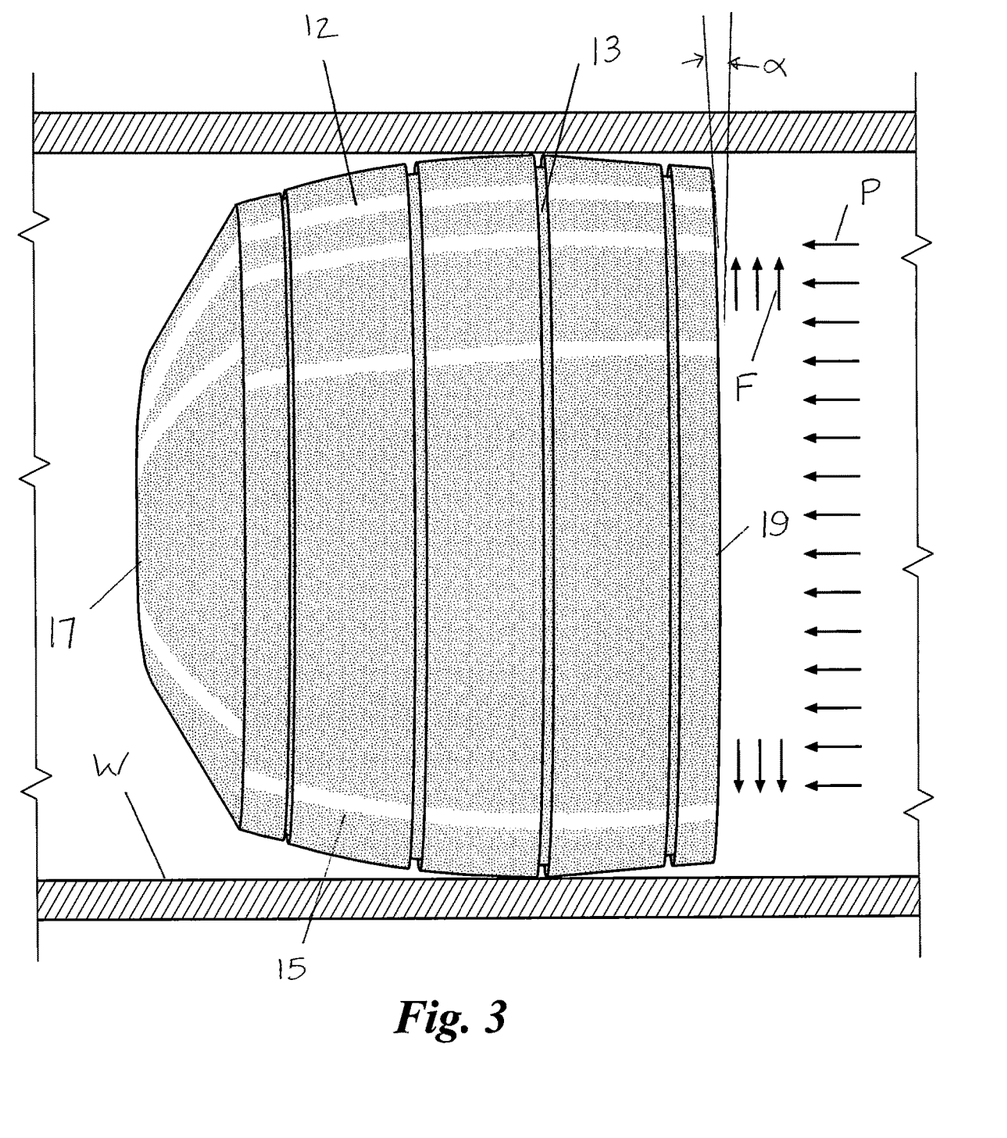
FIG. 3 is a model illustrating the internal structure's ability to deflect radially to maintain a radial seal of the pig. When in an intended use, the deformation will be contained by the pipeline to maintain the forces needed for sealing as the pigging element wears during its transit through a pipeline run. The pigging element shown here is in an intermediate inflated state. When fully inflated, the pigging element lies flat against the pipe wall.

In some embodiments at least one third different circumferential band may be provided. The third band may have a different section modulus than the first and second bands 13, 15. The third band may also have a different width than the first or second bands 13, 15. The third band may have the same section modulus as the first or second bands 13, 15 but may have a different width. In some embodiments, the ribs 14 may be spaced apart across the width w1, w2 of one of the bands 13, 15, giving the band different section moduli across the width. Using FIG. 2 as an example, the spaced-apart ribs 14 may be included across the band 15, thereby providing zones 13 or a third zone different than zone 13.

The pigging element 10 may have a length L1 when in a first state and an extended length L2 when in a second state. When in the extended length L2, the bands 13, 15 alone or in some combination with one another or a third band, may appear as a bellow. The hollow body 11 may have an accordion-like appearance along its length L1, L2. The pigging element 10 can expand and contract axially and radially in response to differential pressure P to maintain the necessary normal forces F between the pigging element 10 and the pipeline wall W without the need of additional fluids or pumps.

Figure 1:
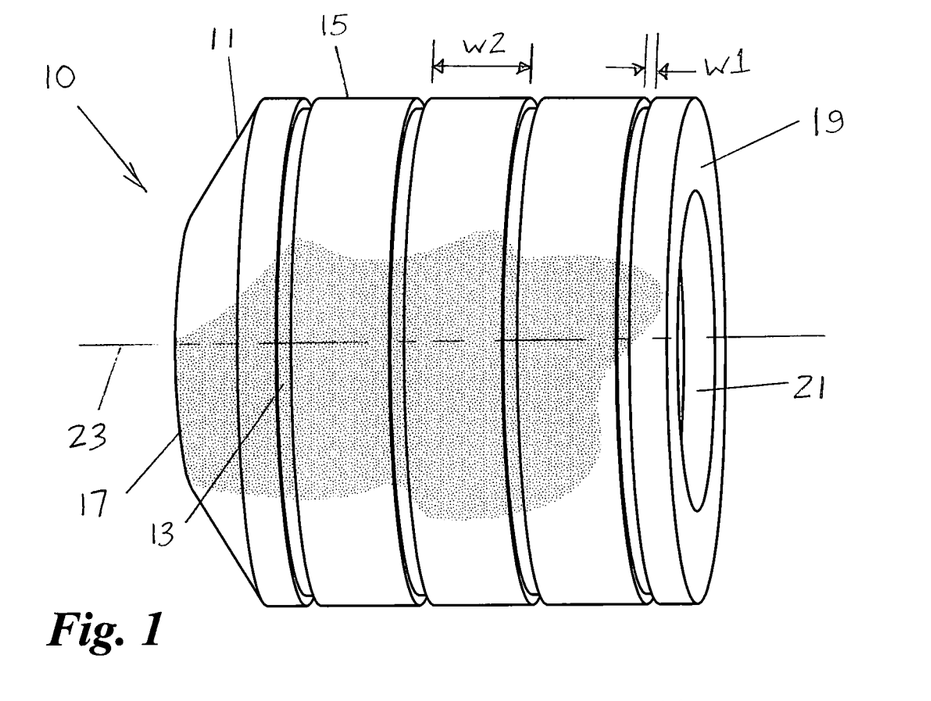
FIG. 1 is an isometric view embodiment of a cylindrical-shaped hollow body this disclosure made of an elastomer material and configured as a pig including pigging elements in the form of circumferential grooves molded into the pig and axially spaced from one another. The pig is shown in its first length and diameter. In other embodiments, the pig may be spherical-shaped and including circumferential grooves.
Figure 6:
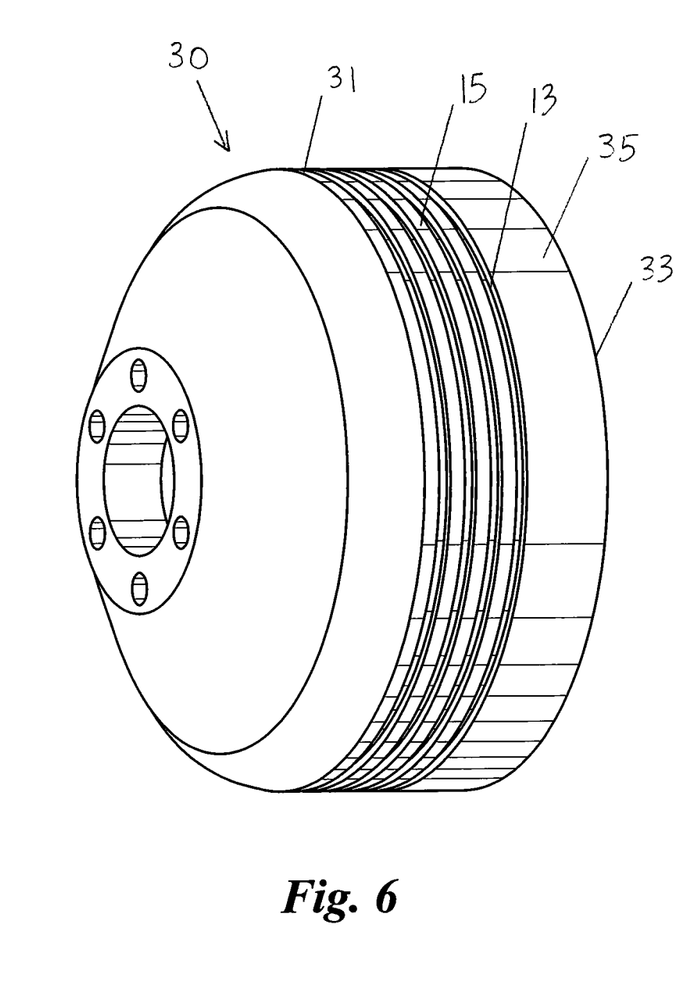
FIG. 6 is an embodiment of a cup-shaped hollow body of this disclosure made of an elastomer material and configured as a sealing element. Because the hollow body expands and contracts in two dimensions, less cups are needed about the mandrel than prior art cups for a given pig while accomplishing the same amount of sealing or cleaning work. The internal pressure increases the normal forces along the cup edge, allowing the lengthening of the sealing edge of the skirt for batching type work.
Figure 7:
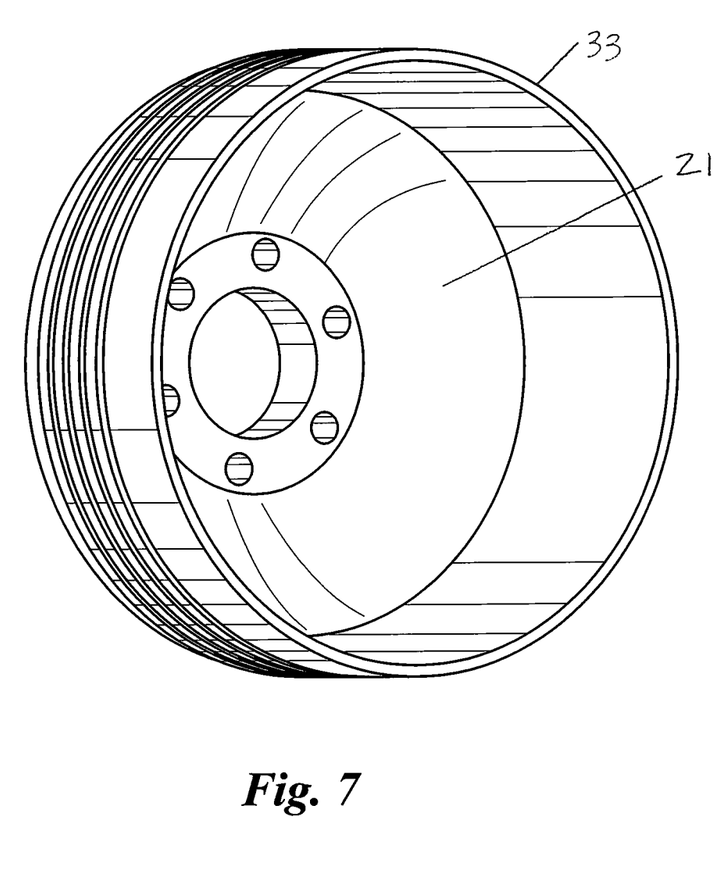
FIG. 7 is a rear isometric view of the cup-shaped hollow body of FIG. 6 and illustrating the internal surfaces. In embodiments, the extended skirt adds a substantial surface area for the pressure to react with to create the normal forces against the pipeline for an enhanced seal. As the cup wears the body will become more flexible, creating a dynamic seal that continues to change to ensure an appropriate seal is maintained with the pipeline inner surfaces.

The pigging element 10 may be configured to scrape or clean the wall W of the pipeline when inserted into a pipeline and traveling within an interior of the pipeline under differential pressure due to product flow. For example, the pigging element 10 may be configured as a cup- or disk-shaped located about a mandrel. See FIGS. 6 & 7. In other embodiments, the pigging element 10 may be configured as a mandrel or pig body including no cups or disks and functioning as a pipeline pig. See e.g. FIGS. 1 & 2. The pigging element 10 may be capable of serving as a separating device between singular or multiple fluids within the confines of the pipe, including but not limited to a batch flow separator.

Because the pigging element 10 is designed to deform in response to pipeline pressure, and because of the conservation of mass, as the pigging element 10 lengthens axially it must decrease radially (and vice versa). The interior surfaces 27 of the hollow body 11 provide area effective to allow the development of the necessary normal force (or differential pressure across the element) as well as create a significant deformation of the hollow body 11 in the axial and radial directions. For example, the resulting force may create an outward deflection of the hollow body 11 capable of maintaining an overall sealing geometry, as well as other properties relative to the pipe wall and induce deflection or growth in the axial direction. Note the internal surface area increases as the pigging element 10 lengthens axially.

In embodiments the pigging element 10 can be designed to transit easily through diameter reductions in the pipeline, returning to its original shape and geometry once through the reduction in diameter. This feature can be very advantageous when moving through an impact bend (ovality) or a reduced section in a pipeline. A pigging element 10 of this disclosure configured as a pig would, therefore, be less likely to become stuck or hung in a line such as can happen with prior art pigs, including those with a metal mandrel outfitted with elastomer cups or disks. If the pig, or a pig including pigging elements of this disclosure, gets into a tight position within the pipeline, the pipeline controller can simply apply more pressure which, in turn, causes the pig or pigging element to stretch axially and reduce radially. Significant modeling conducted by the inventors and associated calculations show noticeable agreement between the section modulus and the pressure driven deformation Embodiments of a pigging element 10 of this disclosure may be configured such that as contact with the wall abrades and wears the element, the element becomes more flexible. This flexibility allows the pipeline pressure behind the element to inflate the element further, thereby maintaining a much higher fraction of the original sealing forces against the pipeline wall throughout the total time in transit when compared to prior art pigging components. This same attribute also allows the pigging element 10 to increase in length as the pressure inside the element interacts with the front inner surface of the element, inducing a change in length due to deformation as a function of applied pressure. Depending on the bands 13, 15 or zones of section modulus, the direction of the pig expansion can be controlled due to conservation of mass and the associated mechanical properties of the elastomer. Designed properly, the radial surface 29 of the element 10 can deflect to maintain a specified force between the pipeline wall and the element, while still allowing the length of the element 10 to change and transit through varying diameters of pipe. Reduced lengths (larger diameter) may be provided when launching embodiments into a pipeline, with expanded lengths (smaller diameter) once integrated into the pipeline.

When traversing from a smaller diameter line to a larger diameter line, the hollow body 11 as well as spring-like circumferential bands 13, 15 that will ensure the pig expands outward again to the original diameter once unconfined from a smaller diameter. Because of the empty center 21, the pigging element 10 can squeeze down onto itself to push into appreciably smaller pipe diameters, unlike a typical prior art pig which is greatly hampered by a metal mandrel. Embodiments of this disclosure do not include a metal mandrel and, therefore, are not hindered by a metal mandrel geometry. The pigging element 10 is capable of changing geometry as needed. This is especially important where pipelines include sections that have different diameters. Designing a prior art pig that can clean the larger diameter line and still be able to squeeze into the smaller diameter lines can be difficult due to the inflexible metal mandrel associated with many designs. A pipeline pig using embodiments of this disclosure can accomplish this task as well as other pipeline pigging applications not previously possible or easy to do with the prior art.

Embodiments of a pigging element 10 of this disclosure may be cast in a mold using an elastomer such as urethane or its equivalent. Prior art urethane pigs are typically cast in molds to form the individual components that are then bolted to a mandrel to form the finished pig. In embodiments of this disclosure, the pig can be cast as a single component. An insert may be utilized during casting which allows a predetermined internal geometry to be formed, creating the design surfaces needed to deliver the uniform deflection of the pig in a controlled manner. The insert may be made from several axisymmetric components, much like a 3d puzzle, allowing the parts to be removed after the urethane has solidified to form the desired overall pig geometry. The material used to form the pig may then post-cure in an appropriate furnace to lock in the mechanical properties of the material. This helps ensure the pigging element 10 maintains the properties for which it was designed while also maintaining the ability to deflect outward to conserve the normal forces and the sealing efficiencies desired.

A pigging element 10 of this disclosure may be placed into a pipeline by means of a launching device of a kind well known in the art. When configured as a pig, in some embodiments the pigging element 10 may be axially compressed and sized to fit in the limited confines of a valve body and then expand to a longer geometry once it interacts with the pressure in the pipeline upon being launched. The design of the section modulus may be modified to achieve a desired effect. For example, the modulus may be modified where appropriate for the pig to achieve a net expanded length when in the line and, therefore, achieve more stability.

The pigging element 10 may be used, depending on its intended use, to keep batch flows separate, bring in water, dewater, and or scrape or clean the pipeline to keep it free of debris. In some embodiments, the pigging element may be used as an inspection pig including one or more sensors. In other embodiments, the pigging element may be configured for use with an inspection pig. Regardless of its intended use, a pig of this disclosure is received by means of a receiving device of a kind well known in the art. The pig may then be reused as needed.

By way of a non-limiting example, embodiments of a pigging element 10 of this disclosure may be configured as a pig for use in a pipeline system having valve launchers. The launcher may be Y-shaped to allow the valve action to inject the pig. (The typical limitation for this style of launcher is its size. The pigs are typically shorter. Because the pigs are shorter, they are more prone to tip over due to the lack of axial stability.) The first size of the pig may be sized for the pig to fit into the valve (shorter length, less diameter) and, after exiting the valve, expand to its second different size (longer length, greater diameter) under pressure to perform the intended task as designed. The ability of a pig to grow under pressure can allow the pig to self-stabilize when launched. The pig enters the fluid stream, changes in geometry with the pressure, and becomes more stable as the pig lengthens with the added pressure of the line. The pig basically makes use of the pressure to better assimilate to the line. Depending on how the pig is designed, the pig can grow substantially on a percentage basis to become more stable in the line.

By way of another non-limiting example, embodiments may be used as a spherical dewatering pig, thereby eliminating the need for intermittent pumping to replace glycol that is squeezed out or displaced during transit and maintain the proper working diameter. The pigs could also traverse branch circuits and valve seats without becoming stuck.

In yet other embodiments, the pigging element 10 is a collapsible pig configured for use in multiple diameter pipelines. In still other embodiments, the pigging element 10 is configured as a one-piece pig that can-do multiple tasks, including multiple tasks in in a bi-directional application.

In embodiments of this disclosure, a pigging element 10 comprises an elastomeric body 11 including a forward 17 and a reward end 19; an empty or hollow center portion 21 located between the forward 17 and rearward 19 ends; a first circumferential band 13 or zone surrounding the hollow center portion 21 and having a first section modulus; two second circumferential bands 15 or zones each adjacent a respective side of the first circumferential band 13 (or one second circumferential band 15 or zone located between two first circumferential bands 13 or zones), the two second circumferential bands 15 surrounding the hollow center portion 21 and having a second different section modulus larger than that of the first section modulus; the elastomeric body 11 moveable between a first length and diameter when in a first state (first inner wall diameter including any anomalies, first pressure, or some combination thereof) and a second different length and diameter when in a second state (second inner wall diameter including any anomalies, second pressure, or some combination thereof). The forward end 17 may include a front wall. The hollow center section 21 may extend an entire length of the pigging element 10 and form a bypass channel through the pigging element 10. The external surface 12 of the elastomeric body 11 maintains sealing engagement with the pipe wall W as it traverses the interior of the pipe, the applied pipeline pressure inflating the pigging element 10 and forcing the surface 12 radially outward.

The pigging element 10 may be configured as a pipeline pig. The pipeline pig may be cylindrical-shaped or spherical-shaped. The pigging element 10 may be cup-shaped or disk-shaped. When configured as a cup 30, the internal pressure increases the normal forces along the cup edge 31, allowing the lengthening of the sealing edge 33 of the skirt 35 for batching type work. The pigging element 10 may include a scraping edge. The elastomeric body 11 may further comprise a mandrel of a kind known in the art. The elastomeric body 11 may contain a urethane material or its equivalent. The elastomeric body 11 may be configured or arranged to connect to the mandrel.

Regardless of the pigging element 10 configuration, the elastomeric body maintains sealable engagement or effective contact with the pipe wall as it traverses an interior of the pipe. Compared to prior art elastomeric bodies used in pigging applications, the elastomeric body of this disclosure is configured or arranged to maintain higher average normal forces and subsequent sealing capability during transit through a pipeline. Further, as the pigging element 10 wears, it becomes more responsive (more easily inflatable) at a given applied pressure than when it was in its unworn position. All of the change in the axial and radial directions comes about in response to changes in the applied pressure, whether that comes about from a change in product flow or a change in pipeline geometry or some combination of the two. In short, the pigging element is self-inflating, requiring no onboard pumps or fluid circuits.

While embodiments of this disclosure have been described, the invention is defined by the following claims and include the full range of equivalents to which each recited element is entitled.

What is claimed:

1. A pipeline pigging element (10) arranged to change its size in an axial and a radial direction as a function of applied pipeline pressure when traversing an interior of a pipeline, the pipeline pigging element comprising:
    an elastomeric body (11) including:
        a first circumferential band (13) having a first section modulus;
        a second circumferential band (15) located adjacent the first circumferential band in the axial direction and having a second section modulus different than that of the first section modulus;
        each of the first and second circumferential bands changing at different rates from one another between an uninflated and an inflated state at the applied pipeline pressure;
    the elastomeric body, when traversing the interior of the pipeline, having a first length and a first diameter at a first applied pipeline pressure and a second length and a second diameter different than the first length and diameter at a second applied pipeline pressure different than the first applied pipeline pressure.

2. The pipeline pigging element of claim 1, wherein, as the pigging element moves between the first length and diameter and the second length and diameter, a sealing force between the elastomeric body and a wall of the pipeline remains unchanged.

3. The pipeline pigging element of claim 1, wherein, as the elastomeric body wears during its traverse of the pipeline, a sealing force between the elastomeric body and a wall of the pipeline remains in a range of 85% to 99% of an original sealing force.

4. The pipeline pigging element of claim 3, wherein, the sealing force is in a range of 85% to 90% of the original sealing force.

5. The pipeline pigging element of claim 3, wherein, the sealing force is in a range of 90% to 95% of the original sealing force.

6. The pipeline pigging element of claim 3, wherein, the sealing force is in a range of 95% to 99% of the original sealing force.

7. The pipeline pigging element of claim 1, further comprising:
    a hollow interior (21), the elastomeric body defining and surrounding the hollow interior.

8. The pipeline pigging element of claim 1, wherein, at least one of the first and second circumferential bands forms a spring between the forward and rearward ends of the pigging element.

9. The pipeline pigging element of claim 1, wherein, the pipeline pigging element is configured as a pig, the pig being sealing cup free and sealing disk free.

10. The pigging element of claim 1, wherein, the pipeline pigging element is configured as a sealing cup or sealing disk arranged for connection to a mandrel of a pipeline pig.

11. A method of maintaining sealing force of a pigging element against a wall of a pipeline as the pigging element traverses the pipeline and wears, the method comprising:
    providing a pigging element (10) arranged to change its size in an axial and a radial direction as a function of applied pipeline pressure when traversing an interior of a pipeline, wherein, the pipeline pigging element comprises:
        an elastomeric body (11) including:
            a first circumferential band (13) having a first section modulus;
            a second circumferential band (15) located adjacent the first circumferential band in the axial direction and having a second section modulus different than that of the first section modulus;
            each of the first and second circumferential zones changing at different rates from one another between an uninflated and an inflated state at the applied pipeline pressure;
        launching the pigging element into the interior of the pipeline; and
        traversing the interior of the pipeline, wherein, the elastomeric body, when traversing the interior of the pipeline, having a first length and a first diameter at a first applied pressure and a second length and a second diameter different than the first length and diameter at a second applied pipeline pressure different than the first applied pipeline pressure.

12. The pigging element of claim 11, wherein, as the pigging element moves between the first length and diameter and the second length and diameter, a sealing force between the elastomeric body and a wall of the pipeline remains unchanged.

13. The method of claim 11, wherein, as the elastomeric body wears during its traverse of the pipeline, a sealing force between the elastomeric body and a wall of the pipeline remains constant in a range of 85% to 99% of an original sealing force.

14. The method of claim 13, wherein, the sealing force is in a range of 85% to 90% of the original sealing force.

15. The method of claim 13, wherein, the sealing force is in a range of 90% to 95% of the original sealing force.

16. The method of claim 13, wherein, the sealing force is in a range of 95% to 99% of the original sealing force.

17. The method of claim 11, wherein, the pigging element further comprises:
    a hollow interior (21), the elastomeric body defining and surrounding the hollow interior.

18. The pigging element of claim 11, wherein, the pigging element is a pig, the pig being sealing cup free and sealing disk free.

19. The method of claim 18, wherein, the pig is a spherical shaped pig.

20. The method of claim 11, wherein, the pigging element is a sealing cup or a sealing disk.

21. A pipeline pigging element (10) arranged to change its size in an axial and a radial direction as a function of applied pipeline pressure when traversing an interior of a pipeline, the pipeline pigging element comprising:
    an elastomeric body (11) including a plurality of alternating first and second circumferential bands (13, 15) in the axial direction,
        the first circumferential band (13) of the plurality having a first section modulus;
        the second circumferential band (15) of the plurality having a second section modulus different than that of the first section modulus;
        each of the first and second circumferential bands changing at different rates from one another between an uninflated and an inflated state at the applied pipeline pressure.

22. The pipeline pigging element of claim 21 further comprising a hollow interior (21), the elastomeric body defining and surrounding the hollow interior.

* * * * *